April 5, 1955   A. W. POMPER   2,705,424
PICK TESTER
Filed April 12, 1951   3 Sheets-Sheet 1
FIG. 4.
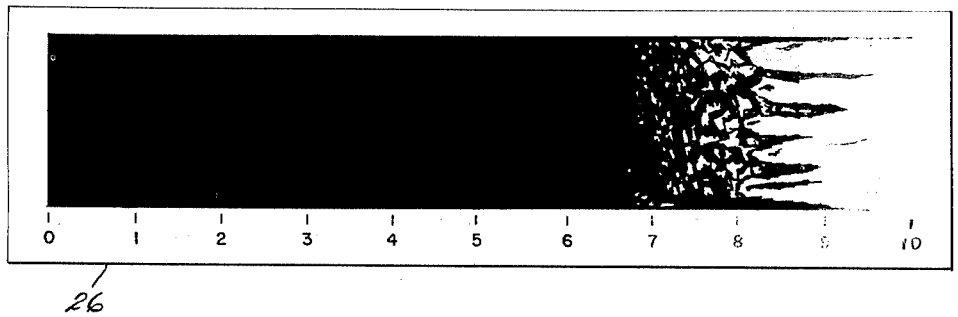
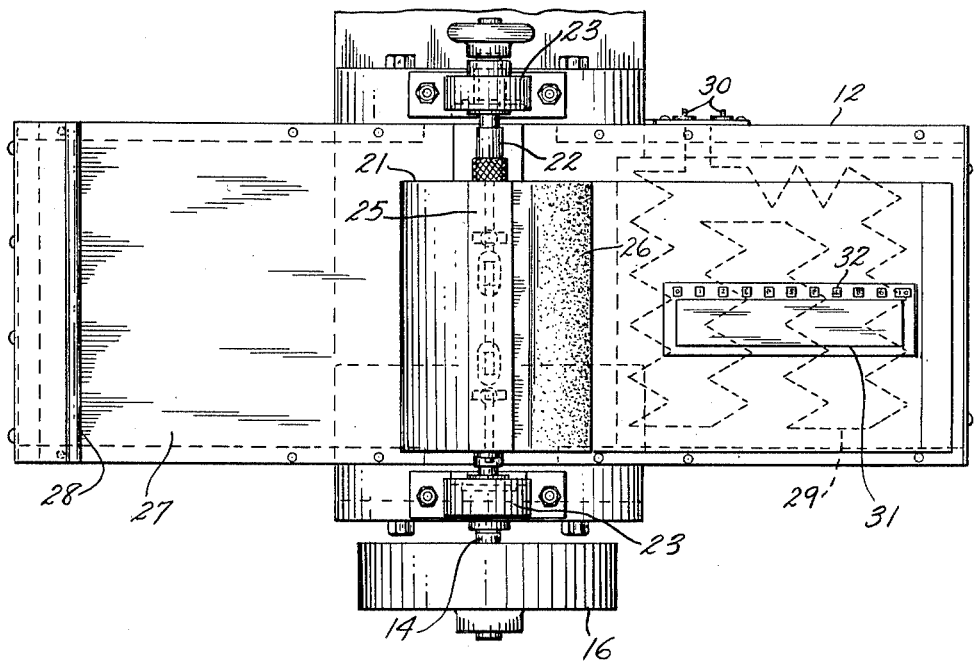
FIG. 1.
INVENTOR
ANTHONY W. POMPER
BY
*Richard S. Shreve Jr*
ATTORNEY April 5, 1955     A. W. POMPER     2,705,424
PICK TESTER
Filed April 12, 1951                           3 Sheets-Sheet 2
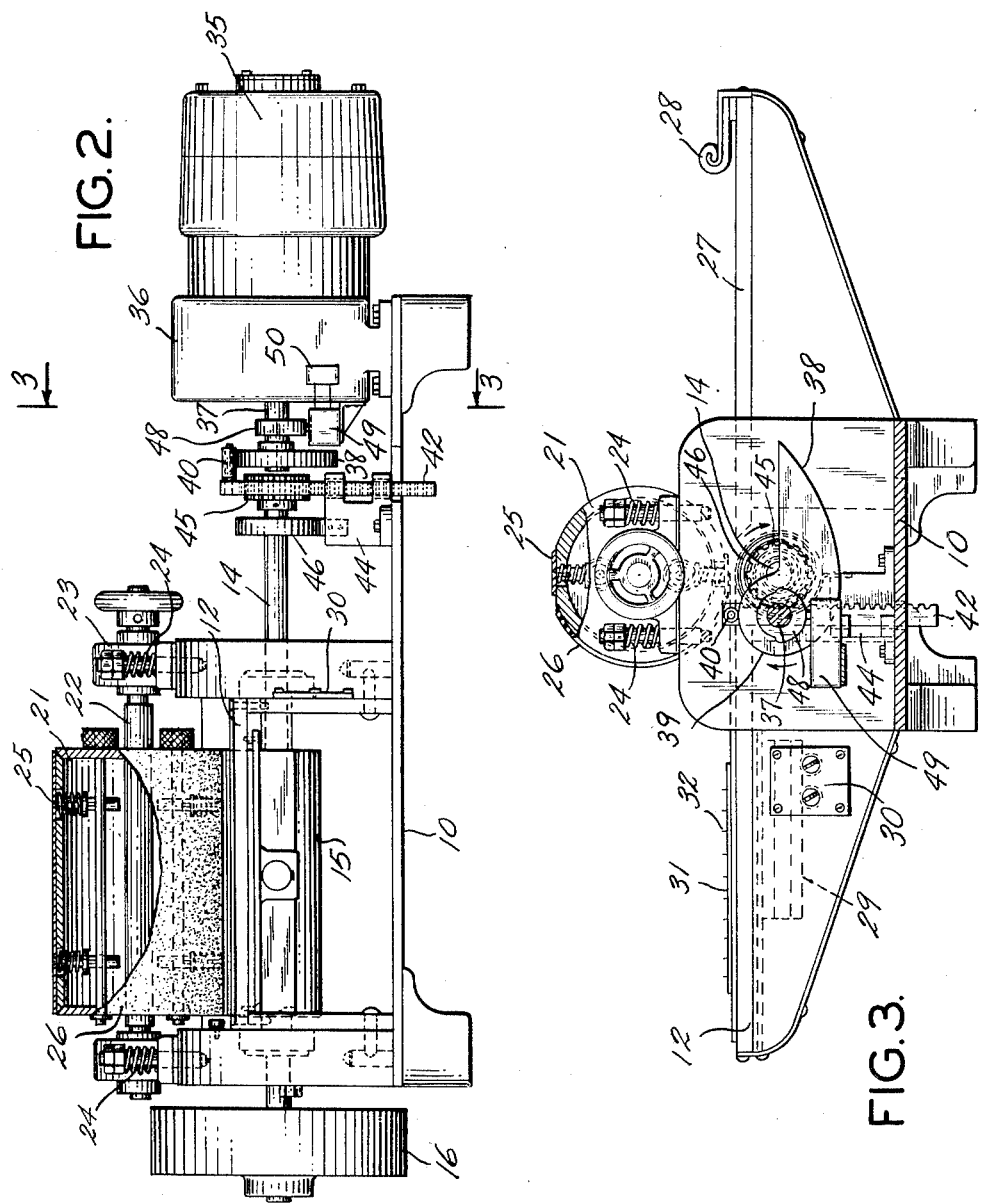
INVENTOR
ANTHONY W. POMPER
BY
Richard S. Shreve, Jr.
ATTORNEY

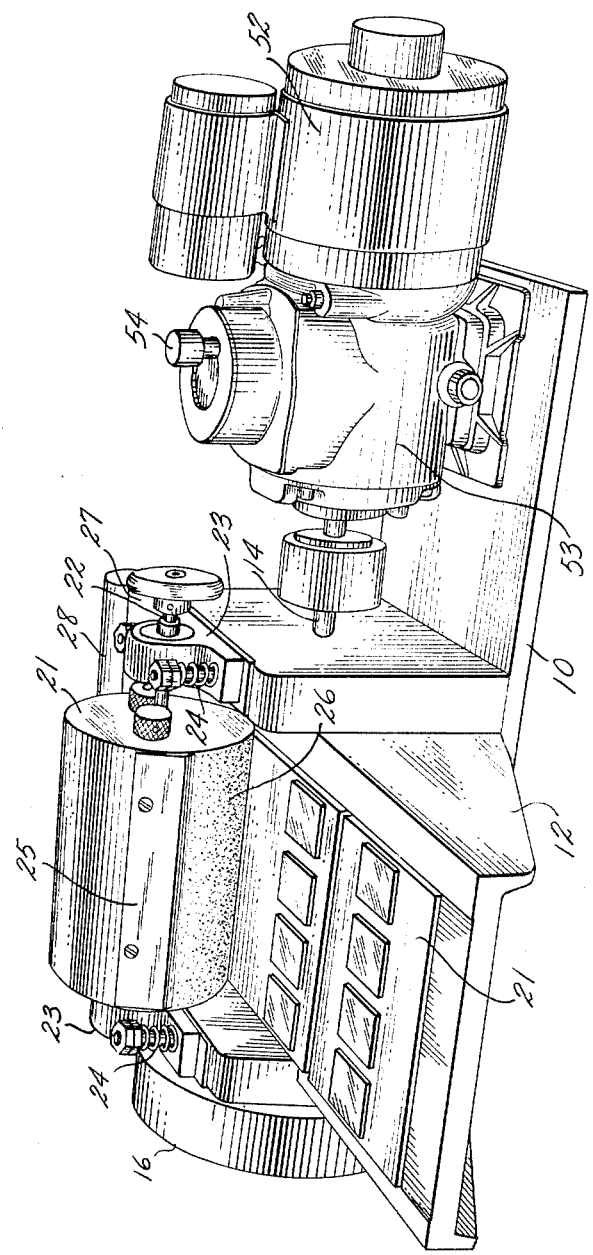

2,705,424

PICK TESTER

Anthony W. Pomper, Bonhamtown, N. J., assignor to John Waldron Corporation, a corporation of New Jersey Application April 12, 1951, Serial No. 220,613

4 Claims. (Cl. 73—150)

This invention relates to pick testers, and more particularly to apparatus for determining the relative resistance of the surface of material such as paper to being disrupted or picked when printed. In the case of coated paper, what is to be determined is the resistance of the coating to being picked off by the adhesion of the inked type; while with uncoated paper, what is to be determined is the resistance of the fibers to being picked off by the same force. The tacky inks and high speeds used in modern printing exert a strong pull on the surface of the material being printed, thus pulling off coating or fiber and producing a poor print as well as requiring cleanup of the printing machine.

The conventional wax test is often unsatisfactory. The shrinkage of the wax due to cooling introduces strains in the wax dependent in magnitude upon the resistance of the coating to compression. An easily compressible coating produces little strain in the wax. Thus the wax is of such strength that coatings will pick at lower tension than the wax. A less compressible coating will introduce strain into the wax, causing it to fail at low tension below that required to pick the coating. Thus the wax test is a measure of the compressibility of the coating rather than its tensile strength or pick. Any relation between the wax test and the bonding strength or pick of the coating is purely coincidental. This coincidental relationship comes from the fact that the bonding strength and the resistance to compression increase simultaneously along more or less parallel lines as the ratio of adhesive clay is increased. This relationship does not hold with many of the new types of adhesives such as latex, however. Thus an adhesive of higher bonding strength than starch or casein may produce a lower wax test. With the advent of these newer adhesives, the deficiencies in the old wax pick test method have brought the paper and printing industries to the realization that the wax test for pick left much to be desired in order to determine the pick test quality of material to be printed.

It is therefore the main object of the present invention to provide apparatus for accurately determining the pick strength of material to be printed.

The pull exerted by an inked surface, such as a printing plate, on the surface being printed increases with the speed of printing, which is the speed at which the ink film on the type is being split. When all other variables which would affect the pull are held constant, the printing speed which just begins to cause picking is an indication of the force required to pick the sheet, or the pick strength.

Accordingly, other objects of the present invention are to maintain constant the temperature of the ink, the pressure of the printing, and to accelerate the speed of printing and thereby utilize the speed at which picking begins as an indication of pick strength.

According to the present invention the sheet material to be printed is pick tested by subjecting successive areas of a sample of the material to substantially constant pressure printing with an ink of constant tack while maintaining the ink at constant temperature, and accelerating the speed of printing for each successive area, whereby the speed of the first area to show evidence of pick is an index of the pick characteristic of the material. For this purpose essentially a variable speed printing press is employed, with all variables other than printing speed held constant. A uniform film of ink is supplied to the printing plate by means of a hand roller or an ink fountain and distributing rolls. The ink is of known constant tack, and since tack varies with temperature, the temperature of the printing plate and the ink film on its surface is held constant by accurate thermostatic control. The print plate is preferably flat and of highly heat conductive material such as aluminum to facilitate the ink temperature control. The printing pressure is held substantially constant for all thicknesses of test samples within the range of the apparatus by pre-loaded springs forcing the gripper cylinder holding the test samples against the print plate. The variation in loading of the springs for different thicknesses of test samples is small compared to the initial loading, thus producing negligible variation in printing pressure over a wide range of test sample thicknesses.

Other objects and features of novelty will be apparent from the following description and the accompanying drawings, in which Figure 1 is a plan view of apparatus according to the present invention;

Figure 2 is a side elevation of the same;

Figure 3 is an end elevation of the apparatus shown in Figs. 1 and 2;

Figure 4 is a plan view of the completed pick test sample; and

Figure 5 is a perspective view of a modification.

The apparatus shown in the drawing comprises a frame 10 having a feed bed 12 and journaling a drive shaft 14 on which is mounted a rubber covered drive roll 15, and a flywheel 16.

Mounted on the frame 10 above the drive roll 15 is a gripper cylinder 21, having a shaft 22 journaled in bearings 23 held down by springs 24 of predetermined constant loading. The cylinder 21 is rubber covered, and has grippers 25 for receiving the edges of test samples 26 of the material to be printed.

The feed bed 12 is substantially tangent to the drive roll 15, and horizontally aligned with a delivery table 27 at the rear of the machine. The table 27 is provided with a bumper 28. The feed bed 12 is of good heat conducting material such as aluminum, and has mounted therebelow an electrically insulated electric heating element 29 controlled by a thermostatic switch 30 having a sensitivity of plus or minus one-tenth of one degree Fahrenheit. A print plate 31, preferably of stainless steel, is slidably supported by the feed bed 12, and is adapted to be inked with an ink of constant tack to a film of uniform thickness, by a hand roller or a conventional ink fountain and distributor rollers not shown.

The ink plate 31 has successive indicia 32 each designating successively increasing speeds. The spacing of the indicia is correlated to the speed of the ink plate 31 at the instant of printing so that one test sample serves for all speeds, and the indicia printed thereby which shows evidence of picking itself prints the speed at which picking takes place.

The shaft 14 is driven by a motor 35 through reduction gearing 36 which imparts a constant speed drive to a cam shaft 37. The shaft 37 has keyed thereon a cam 38, which has a semicircular portion 39 concentric with its shaft 37 so as to impart no motion to the cam follower 40. The remainder of the cam surface is of a shape calculated to give the drive roll 15 a peripheral speed accelerating from zero to 740 feet per minute so as to give the desired relation of printing speed to distance along the ink plate.

For example, the formula $V=KS$ is employed where V is the printing speed, K is a constant, and S is the distance from the loading end of the ink plate to the point where printing is occurring. Thus the printing speed is directly proportioned to the distance along the plate.

The cam follower 40 is mounted on a rack 42 vertically slidably mounted in a guide 44, and meshing with a pinion 45 keyed on the shaft 14. A coil return spring 46 surrounds the shaft 14 and has its inner end secured thereto with its outer end secured to the guide 44 or other stationary part of the frame 10. The shaft 37 also has keyed thereon a secondary cam 48 which operates a switch 49 to turn off the motor 35 at the end of the drive stroke.

In operation, the inked plate 31 is set on the feed bed 12, which is maintained at constant temperature by heater 29 and thermostat 30. The plate 31 and its ink film are thus maintained at constant temperature due to high heat conductivity of the ink plate. A sample 26 of material to be pick tested is placed on the gripper cylinder 21. The ink plate 31 is pushed along the feed bed 12 to contact the drive roll 15 and the gripper cylinder 21, raising the cylinder 21 against the action of the preloading springs 24, and being driven through at accelerating speed by the drive roll 15.

The rotary motion of the cam 38 forces upward the cam follower 40 and the rack 42 to which it is attached, turning the pinion 45 which drives the drive roll 15, and then accelerating the ink plate 31. The ink plate prints against the test sample 26 held on the cylinder 21 by the grippers 25 and is ejected from the nip between the drive roll 15 and the gripper cylinder 21 and is stopped by the bumper 28 when the rack 42 is driven to near the maximum position. Where the cam 38 has rotated to just beyond this point, the motor 35 is stopped by the switch 49 tripped by the secondary cam 48. The rack, cam follower, pinion and drive roll are returned to their original positions by the coil spring 46.

Another sample may then be placed on the gripper cylinder 21, the ink plate 31 placed in proper position between the gripper cylinder and the drive roll 15, and the cycle initiated again by pressing the momentary contact switch 50 in order to start the motor 35. The cam shaft 37 rotates, turning the secondary cam to a position which will allow the switch 49 to close and maintain the motor circuit closed with the momentary contact switch released. The motor accelerates while the circular portion of the cam is in contact with the follower, and is at full speed by the time the drive portion of the cam is in position.

The completed test sample as shown in Figure 4 has been removed from the grippers 25 and inspected for evidence of picking. The numbers zero to 6 are true black or full color, while the number 7 shows evidence of pick. The subsequent numbers are faint or entirely unprinted, so that the number 7 is the pick test number.

In the modification shown in Fig. 5 a constant speed motor 52 drives the machine through a variable speed transmission 53 having a speed selector knob 54. The other parts are identical with those shown in Figs. 1 to 3 inclusive, and are given the same reference characters.

In operation of the embodiment shown in Fig. 5, the speed selector knob is set at a speed at which picking is estimated to begin. Print plate 21 is driven through the machine at the selected constant speed. If no picking is noticeable, another test is made at high constant speed, while if substantial picking has occurred, another test is made at lower speed, until the machine is driven at the speed at which picking just begins to occur. This speed is a relative measure of the force required to pick the sample, or the pick strength of the material.

What is claimed is:

1. Apparatus for pick testing sheet material to be printed, which comprises means for subjecting successive areas of a sample of the material to substantially constant pressure printing with an ink of constant tack, means for maintaining the ink at substantially constant temperature, and means for accelerating the speed of printing for each successive area to a final speed beyond that at which picking occurs, and at which the printing on the final area of the succession is unsatisfactory, whereby the speed of the area which shows evidence of pick is an index of the pick characteristic of the material.

2. Apparatus for pick testing sheet material to be printed, which comprises means for passing successive areas of a sample of the material in a cylindrical path in rolling contact at substantially constant pressure with a type plate inked with an ink of constant tack, means for maintaining said type plate at substantially constant temperature, and means for accelerating the speed of the rolling contact for each successive area to a final speed beyond that at which picking occurs, and at which the printing on the final area of the succession is unsatisfactory, whereby the speed of the first sample which shows evidence of pick is an index of the pick characteristic of the material.

3. Apparatus for pick testing sheet material to be printed, as claimed in claim 1, comprising a drive roller, a gripper cylinder journaled above said drive roller on bearings spring loaded at constant pressure, a print plate adapted to be driven by said drive roller between it and said gripper cylinder, and means for driving said drive roller at successively increasing speeds.

4. Apparatus for pick testing sheet material to be printed, as claimed in claim 1, comprising a feed bed adapted to receive a print plate, a heater for said feed bed, and a thermostat for controlling said heater.

References Cited in the file of this patent

UNITED STATES PATENTS

| | | |
|---|---|---|
| 1,860,957 | Rutkoskie | May 31, 1932 |
| 1,939,814 | Hoch | Dec. 19, 1933 |
| 2,051,464 | Braduer et al. | Aug. 18, 1936 |
| 2,567,578 | Ranger | Sept. 11, 1951 |